Figure 1:
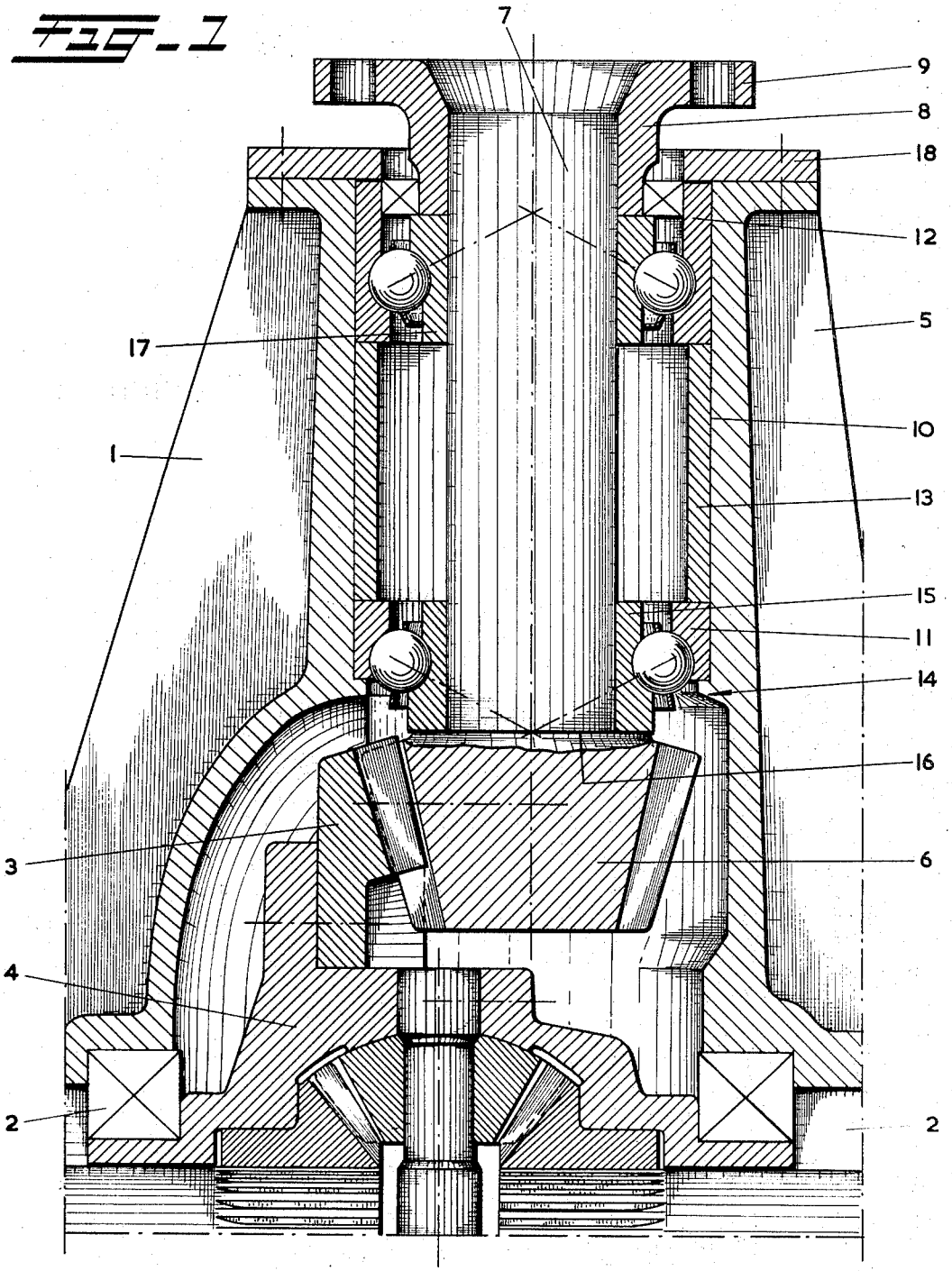

United States Patent [19]
Åsberg

[11] 3,792,625
[45] Feb. 19, 1974

[54] PINION GEAR TRANSMISSION

[75] Inventor: Sture Åsberg, Savedalen, Sweden

[73] Assignee: SKF Industrial Trading and Development Co. N.V., Overtoom 141-145, Amsterdam, Netherlands

[22] Filed: June 28, 1971

[21] Appl. No.: 157,594

[52] U.S. Cl. ................................................ 74/424
[51] Int. Cl. ........................................... F16h 1/14
[58] Field of Search ............ 74/423, 424, 710, 713; 308/187, 191, 193, 195

[56] References Cited
UNITED STATES PATENTS

| | | | |
|---|---|---|---|
| 1,956,237 | 4/1934 | Hughes | 74/424 |
| 3,375,727 | 4/1968 | Nasvytis et al. | 74/423 X |
| 783,168 | 2/1905 | Baker | 74/713 |
| 899,891 | 9/1908 | Niclausse | 74/713 |
| 3,385,133 | 5/1968 | Terao | 74/710 |
| 3,290,101 | 12/1966 | Recknagel | 308/187 |
| 1,835,525 | 12/1931 | Robbins | 74/710 X |
| 1,369,210 | 2/1921 | Zimmerman | 74/424 X |
| 1,708,710 | 4/1929 | Vincent | 74/424 |

*Primary Examiner*—Benjamin W. Wyche
*Assistant Examiner*—Frank H. McKenzie, Jr.
*Attorney, Agent, or Firm*—Howson & Howson; Eugene E. Renz, Jr.

[57] ABSTRACT

Pinion gear transmission comprising a pinion shaft, a pinion wheel at one end of said shaft, connecting means at the opposite end of said shaft for connecting said pinion wheel and shaft to drive means, a housing, bearing means for rotatably supporting said pinion shaft and connecting means relative to said housing, said pinion shaft and connecting means movable axially relative to one another to preload said bearing means and means for permanently fixing said shaft and connecting means with said bearing means preloaded, said shaft, bearing means and connecting means forming an integral unit.

17 Claims, 5 Drawing Figures

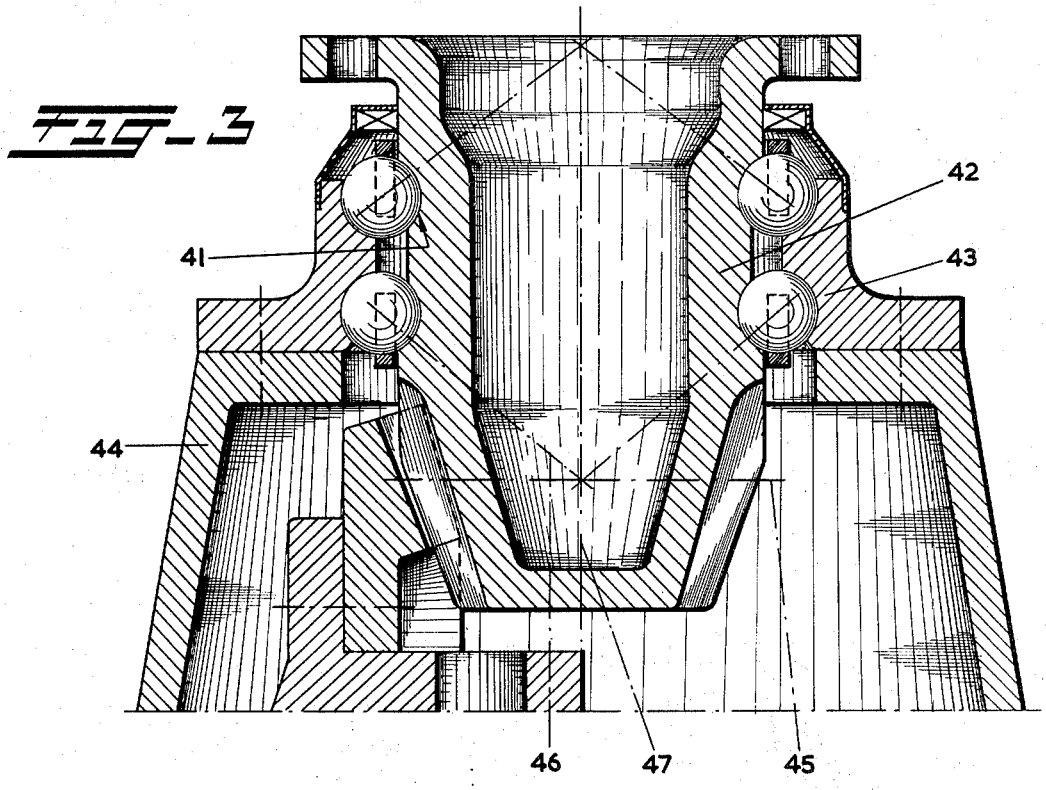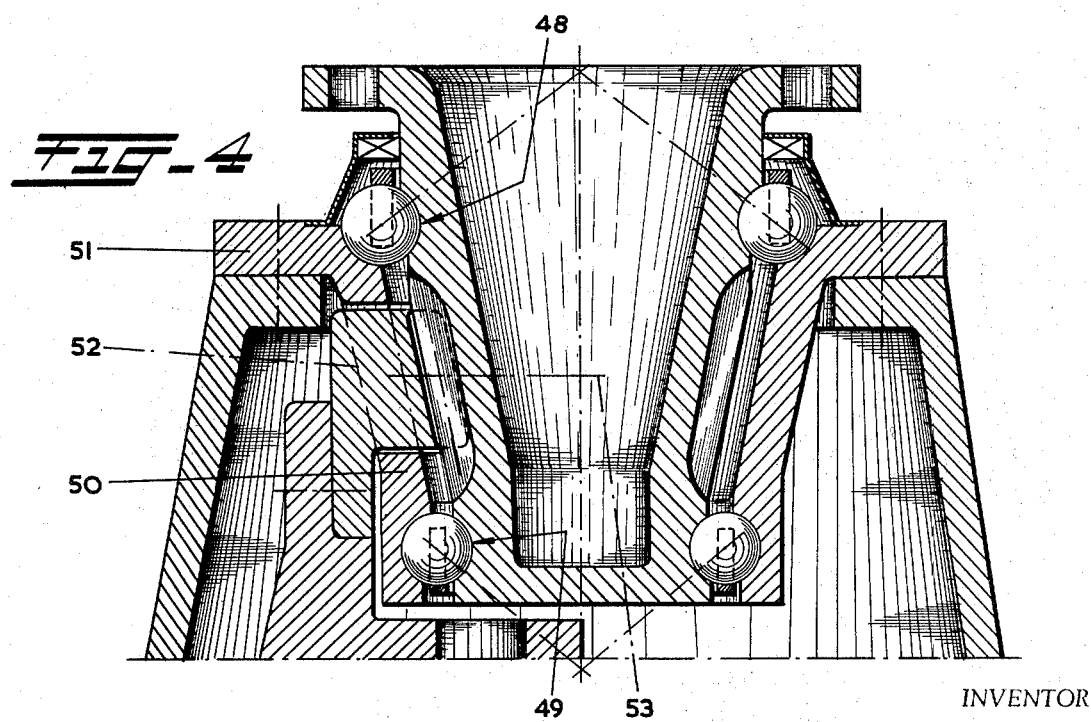

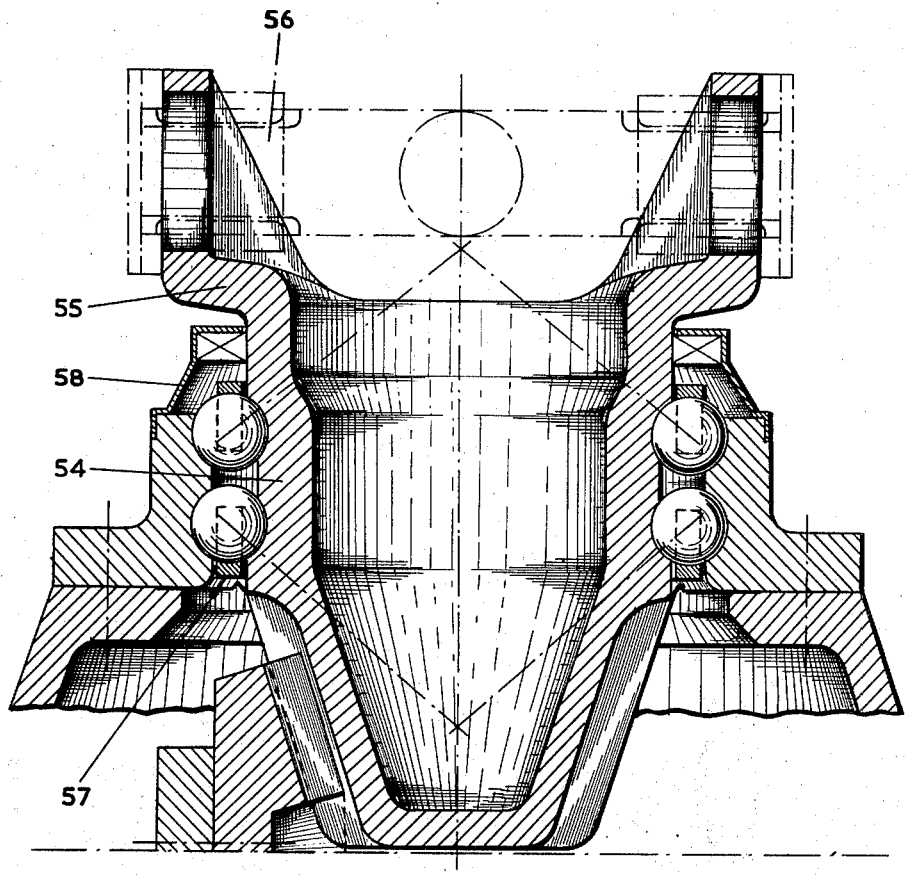

PINION GEAR TRANSMISSION

The present invention relates to a pinion gear transmission comprising a pinion wheel, a pinion shaft and connecting means at the end of said shaft opposite the pinion for connecting it to a drive means, a housing part and roller bearing supporting the pinion shaft within the housing part. Pinion gear transmissions of this kind are well known. They are used in a great number of automobile cars in particular to transmit the drive couple from a longitudinally extending shaft towards transversely extending wheel driving shafts, the pinion gear engaging a crown wheel within a transmission housing. Transmissions of said kind have to withstand loads of largely varying magnitude. This requires preloading of the bearings of the pinion shaft and a precise adjustment of pinion gear wheel and crown wheel with respect to each other. Preloading and adjustment are performed by means of chimbs or rings between the shoulders of the bearing ring and shoulders on the housing and/or shaft. This operation is difficult, requires high skill and time and is extremely difficult to perform in case of repair.

Further problems in the design and construction of this kind of transmission have to do with:
  a. the rigidity of the constructional parts such as radial bending and axial elastic deformation,
  b. surface contact deformation of all the parts,
  c. heat elongation in operation, and
  d. machining tolerances between the several parts forming the construction, such as pinion shaft, housing, seats and shoulders for the bearings and the bearings themselves.

Purpose of the invention is to provide a pinion gear transmission which takes away part or all of the above-described disadvantages and according to the invention, this has been achieved primarily in that the shaft, the pinion, the connecting means and the inner races of the bearings form a unit which after its assembly cannot be taken apart. This assembly has, of course, the proper preloading of the pinion shaft bearings. The unit can be made in such a way that the proper adjustment of the pinion gear wheel with respect to the crown wheel is included as well. It, however, is also possible to allow separate adjustment of the gear wheels with respect to each other which can be achieved by providing a separate housing for the pinion gear, which housing is flanged to the transmission housing in a known way.

In the sense of a provision of the unit, the said connecting means can extend radially outwardly beyond the inner races of the bearing. This measure known per se now makes more sense than in combination with splines and a locking nut as known.

It is, according to the invention, also possible to provide the unit with complete bearing means, which means not only the inner race surfaces, but also the rolling elements, cage and outer rings, which simplifies mounting of the unit. A further simplification is obtained in that the housing part is a common race ring for the bearings, having a radial flange for connecting it to the transmission housing.

According to the invention, the shaft, the pinion and the connecting means now can consist of only one work piece. This work piece can be a hollow pressed or forged metal body closed at one end having pinion gear teeth and race surfaces. Such a work piece is easy to manufacture and has the advantage that the machining of the teeth and of the race surfaces can be performed in one fixture. A further advantage of the hollow structure is that proper cooling takes place there where the heat is generated between the teeth.

By those measures, a construction is obtained which can be very rigid, does not materially change its dimensions at elevated temperatures due to the cooling and its possible short axial length, has less tolerances and the accuracy of the bearing surfaces with respect to the gear teeth is better. If axial-radial bearings are used, the contact lines cover better the axial distance between the load at the connecting means and the load line at the gear wheel. With respect to bending loads occurring in the construction, this provides a much better position than with the known constructions.

According to the invention, it is, however, also possible that the shaft and pinion form one work piece and the connecting means are undetachably secured to the shaft. This can be done, e.g. by welding during the preloading operation of the bearing elements during assembly. It is also possible that the shaft and connecting means form one work piece and the pinion is undetachably secured to the shaft. The assembly and preloading can be performed in the same way as described above.

By those constructions, it is also possible to enlarge rigidity, reduce the axial dimensions and reduce the tolerances. It, however, remains possible to make use of conventional rolling bearings having separate inner and outer race rings.

When only one work piece is used, e.g. the hollow pressed or forged work piece, preloading takes place by the insertion of the balls. With this embodiment, it is possible to provide the race surfaces for the rolling bearings on both sides of the pinion teeth.

By this measure, rigidity can further be improved while in particular with one row ball bearings on either side of the teeth, the axial length remains short with only a very short portion protruding from the housing at the side of the connecting means.

The construction can be made also in such a way that the pinion and connecting means have concentric shaft forming cylindrical portions fitting into each other; the connection then also can be performed during the preloading operation by means of welding. In that case, the inner race surfaces can be provided in the outer surface of one and/or both shaft forming concentric portions.

Although separate race rings in some embodiments of the unit according to the invention are possible, it is advantageous to machine the race surfaces in the part or parts of the work piece itself reducing in this respect the number of tolerances considerably.

The entire construction can be such that the pitch diameter of the bearing located between the pinion and the connecting means is larger than the outermost diameter of the pinion teeth. This enlarges the bearing capacity and in some cases, simplifies the assembly.

A construction of very short axial length now is possible, having the bearings as close as possible to the gear teeth. It is of further advantage to dimension the parts such that the inner diameter of the cage is larger than the said outer most diameter of the teeth to also simplify the assembly of the bearing.

In all embodiments according to the invention, the axial length of the pinion gear transmission can be considerably reduced as compared to known embodiments the degree of length reduction depending upon the design such as the presence of separate race rings or not.

With all embodiments according to the invention, the preloading is performed during manufacturing and the adjustment can be included or not. In case of repair, the cheap unit has to be replaced which no longer requires skilled labor. The number of places where surface contact deformation can take place is reduced as well as the number of places where tolerances occuring during machining play a role. A larger diameter is possible and the shorter length reduces radial bending under the load occurring between the gear wheels and contributes to the rigidity. The short length reduces heat elongation.

The construction of the unit accordingly allows the possibility to use all kinds of cheaper manufacturing methods.

In all cases, the cardan coupling may form an integrated part of the connecting means, due to the fact that no nut is present at the end of the pinion shaft.

Large ball and pitch diameters are possible, and with the embodiments of short length, the working angle can be chosen such that the working line of the forces goes through the area where the working angle intersects the axis of the shaft so that there is no or only a very short overhang reducing bending forces.

The gear function no longer is spoiled by the weakness of the constructional parts resulting from tolerances and elastic deformation so that higher precision can be easily achieved.

The invention now will be further elucidated with reference to the drawings.

In the FIGS. 1 to 5 inclusive different embodiments of the invention are shown in cross section.

The embodiment of FIG. 1 of all embodiments shown in the Figs. has the smallest difference with respect to the known constructions. In FIG. 1, the transmission housing has been indicated in general by the reference 1. In said housing by means of bearings 2 a crown wheel 3, secured to a differential gear transmission 4, has been supported.

The pinion gear is supported by means of bearings in the housing part 5.

According to the known constructions, shaft and housing part are provided with shoulders and the bearings have outer and inner race rings while the connecting means are secured to a splined portion of the shaft end and held in place by means of a nut on the screw threaded outer end of the shaft, which nut plays an important role in the preloading of the bearings.

In the construction shown in FIG. 1, the pinion gear wheel 6 has a shaft 7 and the connecting means are formed by a sleeve 8 having a flange 9.

The housing 5 has a cylindrical bore 10 accommodating the outer race rings 11 and 12 of the two axially spaced bearings, which race rings 11 and 12 are spaced apart by a cylindrical sleeve 13, the ring 11 engaging a shoulder 14 of the housing. The inner race ring 15 fits upon the shaft 7 and engages a shoulder 16 of the pinion wheel. The other inner race ring 17 fits upon the shaft 7 and rests against the sleeve 8 of the connecting means 9.

After assembling the above-mentioned parts with finally putting the cylindrical sleeve portion of the sleeve 8 over the cylindrical end of the shaft 7, the bearing is preloaded by pressing the connecting means and the pinion in opposite directions towards each other. When the desired degree of preloading is achieved, the sleeve 8 and the shaft 7 are permanently connected by means of welding, which can be done in a number of well known ways, such as electrobeam welding, spinwelding, etc.

The unit obtained in this way is locked in the housing by means of two half rings 18.

The axial length of this embodiment as compared with the known embodiment is reduced by the fact that the splined shaft end and the screw threaded end no longer exist. The construction of the shaft itself is simple since it has only a cylindrical outer surface.

The construction shown in FIG. 1 shows balls for the bearings, but it will be clear that also other rolling elements can be used.

Figure 2:
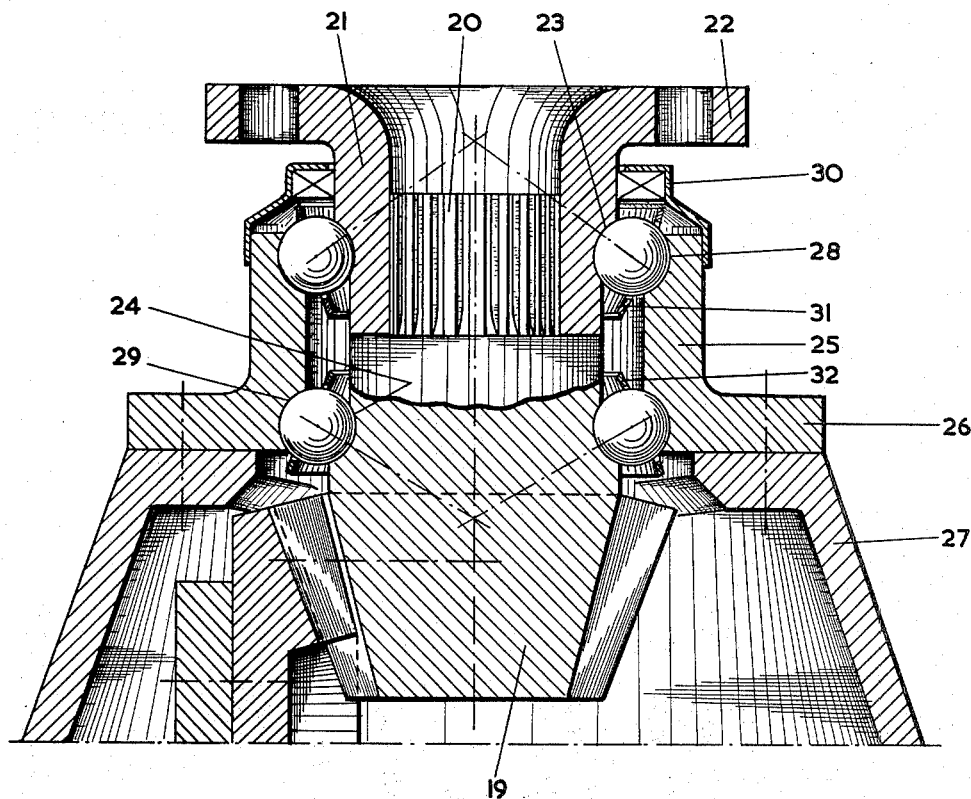

FIG. 2 shows an embodiment which axially has a considerably shorter length. In this embodiment, pinion and shaft 19 and 20 respectively form an integral body and the connecting means again have the form of a sleeve 21 with flange 22, which parts are permanently connected, e.g. by means of welding.

In this embodiment, the race surfaces 23 and 24 of the two ball bearings are machined in the material of pinion shaft 20 and sleeve 21 itself. The outer part of the assembly is formed by a sleeve 25 with a flange 26 to enable the unit obtained in this way to be secured to the housing 27. Adjustment of the gear wheels with respect to each other can be performed by means of chimbs between flange 26 and housing 27. Also, in this sleeve the race surfaces 28 and 29 are directly machined in the material of the sleeve 25 itself. 30 indicates a sealing of the bearing. In this embodiment, sleeve 21 and shaft axially abut each other and are axially machined so accurately that the correct preload value has been obtained when the parts are welded together.

This embodiment is considerably shorter in axial direction.

The only surfaces between which tolerances play a role are the race surfaces with respect to the balls.

FIG. 3 shows an embodiment in which the pinion, the shaft and the connecting means form one integral part 42 made by pressing or forging steel into a hollow body, the hollow space extending through almost the entire length of the integral body. The race surfaces 41 for the balls are machined in the body 42 itself, and the same holds true for the outer flanged sleeve 43, which serves for connecting the unit to the housing 44.

The axial length of this embodiment is very short and its diameter very large. From the load line of the gear wheels as indicated with 45 and the working line of one of the roller bearings indicated with 46, it follows from FIG. 3 that the two load lines 45 and 46 intersect the axis 47 in one point which means that there will be minimum bending stresses in the body 42 and a high capacity large diameter ball bearing is possible.

FIG. 4 shows another development of the constructive principle of FIG. 3 by using a hollow forged integral body in which the gear teeth of the pinion wheel are machined in the body between the race surfaces 48 and 49 of the two ball bearings. The outer sleeve 50 with flange 51, of course, now has a greater axial length and is provided with an opening 52 through which the crown wheel can engage the teeth 53 of the pinion wheel.

The preloading of the embodiments shown in FIGS. 3 and 4 has to take place by the insertion of the balls.

As shown in FIG. 3, the pitch diameter of the largest bearing is greater than the outermost diameter of the gear teeth of the pinion wheel. It will be clear that this pitch diameter even can be still larger as shown in FIG. 3. The inner diameter of the cage of the bearing is such that it can be easily shifted over the gear teeth.

FIG. 5 shown an embodiment based on the same principle as the one according to FIGS. 3 and 4 with this difference, however, that the pressed or forged body 54 has integral connecting means in the form of eyes 55 to accommodate one of the swingable parts 56 of a cardan coupling.

This embodiment shows at 57 and 58 seals which enable the provision of a completely ready unit from which the lubricant will not leak and in which the bearing is protected against gear-wearing particles. Clean store handling is now possible.

What is claimed is:

1. Pinion gear transmission comprising a pinion shaft, a pinion wheel at one end of said shaft, connecting means at the opposite end of said shaft for connecting said pinion wheel and shaft to drive means, a housing, first and second bearing means axially spaced apart for rotatably supporting said pinion shaft and connecting means relative to said housing, each of said bearings means including a plurality of rolling elements engageable between inner and outer raceways, said pinion shaft and connecting means moveable axially relative to one another thereby to effect displacement of said inner and outer raceways of said bearing means, to preload said bearing means and means for permanently fixing said shaft and connecting means with said bearing means preloaded, said shaft, bearing means and connecting means forming an integral unit.

2. Pinion gear transmission according to claim 1, characterized in that the connecting means extend radially outwardly beyond the inner races of the bearing.

3. Pinion gear transmission according to claim 1, characterized in that the housing part is a common race ring for the bearings, having a radial flange for connecting it to a transmission housing.

4. Pinion gear transmission according to claim 1, characterized in that the shaft and pinion form one work piece and the connecting means are undetachably secured to the shaft (FIG. 1).

5. Pinion gear transmission according to claim 1, characterized in that the shaft and connecting means form one work piece and the pinion is undetachably secured to the shaft.

6. Pinion gear transmission according to claim 1, characterized in that the pinion and the connecting means have concentric shaft forming cylindrical portions fitting into each other (FIG. 2).

7. Pinion gear transmission according to claim 6, characterized in that the inner race surfaces are provided in the outer surface of one and/or both shaft forming concentric portions.

8. Pinion gear transmission as claimed in claim 1 wherein said bearing means comprises two rows of rolling elements axially spaced apart, the inner raceway for one of the rows of rolling elements being formed integrally on the exterior surface of said connecting means and the inner raceway for the other row of rolling elements being formed on said pinion shaft.

9. Pinion gear transmission as claimed in claim 8 including an annular member adapted to be connected to said housing and having integrally formed therein the outer raceways for the rows of rolling elements.

10. Pinion gear transmission as claimed in claim 1 wherein said connecting means comprises a sleeve member and wherein the opposite end of said pinion shaft telescopically engages in said sleeve and wherein said bearing means comprises two axially spaced bearing assemblies, each bearing assembly comprising inner and outer rings and rolling elements in the annular space between the rings and including a spacer element engaging the outer rings of the bearing assemblies to space the same, the inner ring of one of said assemblies abutting a shoulder on the pinion shaft and the inner ring of the other bearing assembly engageable by said sleeve member.

11. Pinion gear transmission as claimed in claim 1 wherein said connecting means is permanently secured to said pinion shaft by means of welding.

12. A method of assembling a pinion gear transmission including a pinion shaft connecting means for rotatably connecting the pinion shaft to drive means, a housing and bearing means rotatably supporting the pinion shaft for rotation relative to the housing consisting of the steps mounting the bearing means on at least the pinion shaft, positioning the connecting means in engagement with the bearing means and pinion shaft in a manner to preload the bearing means and permanently securing the connecting means to the pinion shaft while the bearing means is preloaded whereby the connecting means, bearing means and pinion shaft form an integral assembly.

13. The method as claimed in claim 12 wherein the pinion shaft and connecting means are permanently connected by welding.

14. Pinion gear transmission assembly comprising a pinion wheel, a pinion shaft and connecting means at the end of said shaft opposite the pinion for connecting it to a drive means, a member for connecting the assembly to a housing and bearing means including a plurality of rolling elements supporting the pinion shaft within the housing, characterized in that the shaft, the pinion, the connecting means bearing means and the inner races of the bearings form a unit which after its assembly cannot be taken apart, said bearing means being preloaded and comprising two rows of rolling elements axially spaced apart, the inner raceway for the rolling elements being formed integrally on the exterior surface of said pinion shaft and the outer raceway for the rolling elements being formed on said connecting member.

15. Pinion gear transmission assembly comprising a pinion wheel, a pinion shaft, connecting means at the end of said shaft opposite the pinion for connecting it to a drive means and bearing means supporting the pinion shaft within the housing and having two rows of rolling elements spaced apart axially, characterized in that the shaft, the pinion, the connecting means, the inner races of the bearing, the rolling elements and the outer races of the bearing form a unit which after its assembly cannot be taken apart and in which the bearing means are axially preloaded.

16. Pinion gear transmission assembly according to claim 15, characterized in that the outer races are formed integrally on the inner surface of a connecting member adapted to connect the unit to the housing.

17. Pinion gear transmission assembly according to claim 16, characterized in that the pinion, the pinion shaft, the connecting means and the inner races consists of only one work piece.

* * * * *

UNITED STATES PATENT OFFICE
CERTIFICATE OF CORRECTION

Patent No. 3,792,625       Dated February 19, 1974

Inventor(s) Sture Lennart Asberg

It is certified that error appears in the above-identified patent and that said Letters Patent are hereby corrected as shown below:

The following should have been added in the issued patent

[30] Foreign Application Priority Data

June 30, 1970 ...Dutch 70.09662

Signed and sealed this 31st day of December 1974.

(SEAL)
Attest:

McCOY M. GIBSON JR.
Attesting Officer

C. MARSHALL DANN
Commissioner of Patents